US007950880B2

(12) United States Patent
Henderer et al.

(10) Patent No.: US 7,950,880 B2
(45) Date of Patent: May 31, 2011

(54) SPIRAL FLUTE TAP

(75) Inventors: Willard E. Henderer, Evans, GA (US); Stephen M. George, Evans, GA (US); Steven R. Burns, East Ryegate, VT (US); Sadayuki Akaki, Fukushima (JP)

(73) Assignees: Kennametal Inc., Latrobe, PA (US); Yamawa Manufacturing Limited, Toyoko (JP)

( * ) Notice: Subject to any disclaimer, the term of this patent is extended or adjusted under 35 U.S.C. 154(b) by 1151 days.

(21) Appl. No.: 11/582,806

(22) Filed: Oct. 18, 2006

(65) Prior Publication Data
US 2008/0095588 A1  Apr. 24, 2008

(51) Int. Cl.
*B23B 51/00* (2006.01)
(52) U.S. Cl. .......................... 408/222; 408/224; 408/230
(58) Field of Classification Search .................. 408/223, 408/224, 227, 229, 230, 222
See application file for complete search history.

(56) References Cited

U.S. PATENT DOCUMENTS

| | | | | |
|---|---|---|---|---|
| 4,065,224 A | * | 12/1977 | Siddall | 408/230 |
| 4,086,733 A | * | 5/1978 | Vig | 451/48 |
| 4,116,578 A | * | 9/1978 | Gelfand et al. | 408/222 |
| 4,174,915 A | * | 11/1979 | Peetz et al. | 407/59 |
| 4,212,568 A | * | 7/1980 | Minicozzi | 407/53 |
| 4,708,542 A | | 11/1987 | Emanuelli | |
| 4,721,421 A | * | 1/1988 | Klinger | 407/63 |
| 4,744,705 A | * | 5/1988 | Imanaga | 408/230 |
| 4,826,368 A | * | 5/1989 | Tikal et al. | 408/225 |
| 5,049,009 A | | 9/1991 | Beck et al. | |
| 5,160,232 A | * | 11/1992 | Maier | 408/223 |
| 5,318,393 A | | 6/1994 | Yamada | |
| 5,487,626 A | | 1/1996 | Von Holst et al. | |
| 5,678,960 A | * | 10/1997 | Just et al. | 408/230 |
| 5,716,172 A | * | 2/1998 | Nakamura et al. | 408/230 |
| 5,829,927 A | * | 11/1998 | Nakamura et al. | 408/230 |
| 5,865,574 A | * | 2/1999 | Tukala | 408/57 |
| 6,022,175 A | * | 2/2000 | Heinrich et al. | 407/119 |
| 6,030,156 A | * | 2/2000 | Andronica | 408/144 |
| 6,045,301 A | * | 4/2000 | Kammermeier et al. | 408/57 |
| 6,045,305 A | * | 4/2000 | Plummer | 408/230 |
| 6,096,436 A | * | 8/2000 | Inspektor | 428/469 |
| 6,164,876 A | * | 12/2000 | Cordovano | 407/59 |

(Continued)

FOREIGN PATENT DOCUMENTS
EP     0 122 176 B1     3/1984
(Continued)

OTHER PUBLICATIONS

Oberg, Erik et al., Machinery's Handbook 24th Edition, a Reference Book for the Mechanical Engineer, Designer, Manufacturing Engineer.. p. 1696.

(Continued)

*Primary Examiner* — Eric A Gates
(74) *Attorney, Agent, or Firm* — Matthew W. Smith

(57) ABSTRACT

A cutting tool that includes an elongate body that has a forward end and a rearward end. The elongate body has a fluted portion that beginning near and extends in a rearward direction from the forward end. The fluted portion has a flute that defines a cutting edge. The flute presents a concave cutting face wherein the concave cutting face is defined by a first radius. The flute further presents a concave core surface adjacent to the concave cutting face wherein the concave core surface is defined by a second radius. The flute presents a convex heel surface adjacent to the concave core surface wherein the convex heel surface is defined by a fourth radius.

22 Claims, 4 Drawing Sheets

U.S. PATENT DOCUMENTS

| | | | |
|---|---|---|---|
| 6,206,062 B1 * | 3/2001 | Motzer | 144/240 |
| 6,345,941 B1 * | 2/2002 | Fang et al. | 409/74 |
| 6,602,029 B1 | 8/2003 | George | |
| 6,840,718 B2 | 1/2005 | Newmark | |
| 6,916,139 B2 * | 7/2005 | Yanagida et al. | 408/230 |
| 6,923,602 B2 * | 8/2005 | Osawa et al. | 408/230 |
| 6,929,434 B2 * | 8/2005 | Prokop | 408/230 |
| 7,001,113 B2 | 2/2006 | Flynn et al. | |
| 7,070,367 B2 * | 7/2006 | Krenzer | 408/226 |
| 7,201,543 B2 * | 4/2007 | Muhlfriedel et al. | 408/230 |
| 7,360,974 B2 * | 4/2008 | Borschert et al. | 408/231 |
| 7,364,390 B2 * | 4/2008 | Krenzer et al. | 408/230 |
| 7,544,021 B2 * | 6/2009 | Flynn | 407/59 |
| 7,665,934 B2 * | 2/2010 | Henderer et al. | 408/222 |
| 7,665,935 B1 * | 2/2010 | Garrick et al. | 408/227 |
| 2001/0018011 A1 | 8/2001 | Volokh | |
| 2002/0106252 A1 * | 8/2002 | Tsuzuki et al. | 407/53 |
| 2002/0159851 A1 * | 10/2002 | Krenzer | 408/230 |
| 2002/0172569 A1 * | 11/2002 | Nakamura | 408/144 |
| 2003/0118411 A1 | 6/2003 | Flynn et al. | |
| 2003/0138302 A1 | 7/2003 | Newmark | |
| 2003/0175086 A1 * | 9/2003 | Muhlfriedel et al. | 408/230 |
| 2004/0105730 A1 | 6/2004 | Nakajima | |
| 2004/0175245 A1 * | 9/2004 | Takiguchi | 408/230 |
| 2004/0247406 A1 | 12/2004 | Malagnino et al. | |
| 2005/0042049 A1 | 2/2005 | Schwarz | |
| 2006/0198708 A1 * | 9/2006 | Krenzer et al. | 408/230 |
| 2006/0216124 A1 | 9/2006 | Oknestam et al. | |
| 2006/0216125 A1 | 9/2006 | Glimpel et al. | |
| 2006/0275092 A1 * | 12/2006 | Yamamoto | 408/230 |
| 2007/0081870 A1 * | 4/2007 | Muhlfriedel et al. | 408/230 |
| 2007/0098506 A1 * | 5/2007 | Flynn | 407/53 |
| 2008/0014033 A1 * | 1/2008 | McAuliffe et al. | 407/63 |
| 2008/0019787 A1 * | 1/2008 | Sampath et al. | 408/230 |
| 2008/0080940 A1 * | 4/2008 | Sorensen et al. | 408/223 |
| 2008/0199268 A1 * | 8/2008 | Krenzer et al. | 408/230 |
| 2008/0232915 A1 * | 9/2008 | Reinhardt et al. | 408/144 |
| 2009/0047085 A1 * | 2/2009 | Liao et al. | 408/230 |
| 2009/0110501 A1 * | 4/2009 | Drori et al. | 408/209 |
| 2009/0183603 A1 * | 7/2009 | Kozak et al. | 81/53.2 |
| 2009/0317202 A1 * | 12/2009 | Zhu | 408/230 |
| 2010/0054881 A1 * | 3/2010 | Thomas et al. | 408/1 BD |
| 2010/0054884 A1 * | 3/2010 | Masuda et al. | 408/230 |
| 2010/0092259 A1 * | 4/2010 | Borschert et al. | 408/230 |

FOREIGN PATENT DOCUMENTS

| | | |
|---|---|---|
| EP | 0 532 802 A1 | 3/1993 |
| EP | 1 442 814 A1 | 8/2004 |
| EP | 0 953 396 B1 | 4/2005 |
| FR | 511234 | 9/1920 |
| FR | 692457 | 8/1930 |
| FR | 1190274 | 10/1959 |
| GB | 700843 | 12/1953 |
| JP | 53058894 A | 5/1978 |
| JP | 54105381 A2 | 8/1979 |
| JP | 61214909 A | 9/1986 |
| JP | 62004515 A2 | 1/1987 |
| JP | 63052908 A * | 3/1988 |
| JP | 63318208 A * | 12/1988 |
| JP | 01171725 A | 7/1989 |
| JP | 01289615 A2 | 11/1989 |
| JP | 2-198707 (A) | 8/1990 |
| JP | 02198707 A | 8/1990 |
| JP | 03149127 A2 | 6/1991 |
| JP | 04075816 A | 3/1992 |
| JP | 06179121 A | 6/1994 |
| JP | 6 315817 | 11/1994 |
| JP | 7 204921 | 8/1995 |
| JP | 07195224 A | 8/1995 |
| JP | 2004148430 A2 | 5/2004 |
| WO | WO 02/28578 A3 | 4/2002 |
| WO | WO 02/087813 A1 | 11/2002 |
| WO | 2004076171 A1 | 9/2004 |
| WO | WO 2004/076108 A2 | 9/2004 |
| WO | 2005/122690 A2 | 12/2005 |
| WO | WO 2005/120786 A2 | 12/2005 |

OTHER PUBLICATIONS

ASTM A 600 92a (2004) "Standard Specification for Tool Steel High Speed" 14 pgs.

European Search Report Application No. 07844153.2-1262/2073950, PCT/US2007081068 dated Dec. 29, 2010 (6 pages).

Henderer, "On the Machanics of Tapping by Cutting", Journal of Engineering for Industry, Trans. A.S.M.E., vol. 99, No. 1, Feb. 1977, pp. 257-262.

Armarego et al., "The Machining of Metals", Prentice-Hall, 1969 pp. 189-200 at p. 189.

\* cited by examiner

SPIRAL FLUTE TAP

BACKGROUND OF THE INVENTION

The invention relates to a cutting tool (or cutting tap) used for the production of internal screw threads in a substrate. More specifically, the invention pertains to a cutting tool (or cutting tap) that has the spiral (helical) flute geometry wherein the spiral flute cutting tap is made from cemented tungsten carbide tool materials.

Mechanisms and machine components that require screw threads have a long history in technology. Specifically, the application of screw threads as fastener components is the dominate way to join parts into assemblies. Although there are many ways to generate screw threads, including both internal screw threads as well as external screw threads, experience has shown that taps (or cutting taps) are the favored way to generate the internal screw thread.

There currently exist two basic tapping methods to generate internal screw threads. The dominant tapping method is by cutting material from the wall of the hole. The cut material is then removed to produce a helical V shaped screw thread. In the other basic tapping method, material is displaced to form an internal screw thread. The cutting method of forming an internal screw thread requires lower torque than does the displacement method.

The dimensional accuracy of the shape and size of the internal screw thread controls the precision and fit of the screw thread assembly. In addition, the speed of tapping, i.e., the production time that it takes to cut the internal screw thread, affects the overall cost to produce an internal screw thread.

The configuration and size of the internal screw thread to be produced dictates the geometry of the tap that may be used. In general, an internal threaded hole may be are either open at the bottom to be a through hole or the internal threaded hole may be closed at the bottom to be a blind hole.

Through threaded holes and blind threaded holes that have a larger diameter (e.g., generally equal to or greater than 12 millimeters in diameter) may be tapped (or cut) with a cutting tap that has a straight flutes. A straight fluted cutting tap is shown and described in PCT Patent Publication WO 2004/076108 A2 for a PRECISION CEMENTED CARBIDE THREADED TAP to Henderer et al. A straight fluted cutting tap may be used to cut through threaded holes or blind threaded holes that have a smaller diameter (e.g., generally less than 12 millimeters in diameter) in materials that form a short, broken chip (e.g., cast iron or aluminum). However, a straight fluted cutting tap is not effective to cut a through threaded hole or a blind threaded hole that have a smaller diameter in materials that produce a continuous chip (e.g., ductile steels such as, for example, AISI 4340 steel). In such a case, the continuous chips generated from the cutting operation bind in the flute of the straight fluted cutting tap and cause the cutting tap to break or otherwise not function at an acceptable level.

There are two generally used remedies for this situation where continuous chips generated from the cutting operation bind in the flute of the straight fluted cutting tap and cause the cutting tap to break or other wise not function at an acceptable level. In the case of cutting through threaded holes, there has been used a spiral pointed cutting tap or a left hand spiral fluted cutting tap (when cutting a right hand thread helix) push the chip ahead of the cutting tap thereby avoiding the chip from binding or jamming in the flute of the straight fluted cutting tap. In the case of cutting blind holes, there has been used a right-hand spiral fluted cutting tap which pulls the chips out of the threaded hole thereby preventing the chips from binding or jamming in the flute of the straight fluted cutting tap.

At the present time, spiral fluted taps (also called helical fluted taps) made from high-speed steel are effectively used to cut blind threaded holes. Specifications for high-speed steel (or high-speed tool steel) are set forth in ASTM Standard A 600 REV A entitled Standard Specification for Tool Steel High Speed.

Although high-speed steel spiral fluted cutting taps operate to produce satisfactory results, cemented tungsten carbide (e.g., cobalt-cemented tungsten carbide) is a preferred material over high-speed steels for manufacturing a cutting tool such as a spiral fluted cutting tap. This preference is due to the cemented tungsten carbide material possessing more optimum properties than high-speed steel such as higher hardness and high temperature stability including the ability to retain hardness at high temperatures. Typically, cutting tools manufactured from cemented carbide (e.g., cobalt-cemented tungsten carbide) can be used at cutting speeds that are at least three times higher than cutting tools manufactured from "high-speed" steel. In addition, cutting tools manufactured from cemented carbide (e.g., cobalt-cemented tungsten carbide) typically exhibit a useful tool life that is longer than the useful tool life of a cutting tool manufactured from "high-speed" steel.

Cemented carbide cutting taps with straight flutes, spiral points and left-hand spiral flutes have been developed and used at high speeds to cut threaded holes. However, cemented carbide right-hand spiral flute cutting taps that have the flute designs are like those commonly used for high-speed steel cutting taps experience chipping when tapping small diameter threaded holes. These right-hand spiral fluted cutting taps present cutting edges and edges at the heel of the flute that are prone to chipping due to the small included angles at the intersection of the flutes and thread flanks at these locations. Chipping results in breakage of the cutting tap or (at a minimum) an inability of the cutting tap to function at an optimum level.

There exists in patent literature different concepts employed for spiral (helical) fluted cutting taps. In this regard, U.S. Patent Application Publication No. 2004/0247406 A1 to Malagino describes a helically fluted tap with steam temperature flute surfaces and PVD coated thread surfaces. U.S. Patent Application Publication No. 2003/0138302 A1 to Newmark describes a helical fluted tap incorporated with a device that chamfers the hole. U.S. Patent Application Publication No. 2003/0118411 A1 to Flynn describes a spiral fluted tap with a helix angle that varies along the length of the tap. British Patent No. 700,843 to Haycock describes a spiral flute tap that has been ground such that the leading end face of each land is axially relieved or backed off at an angle. PCT Patent Publication WO 02/087813 A1 to Oknestam describes helical fluted taps with chip breakers incorporated with the surfaces of the flutes.

WIPO 02/28578 A3 (Apr. 11, 2002) to George describes a spiral fluted drill with a flute shape having a heel with a convex radius. However, there are substantial differences in the cutting action of taps and drills. In generating a hole, drills are required to displace and remove material from the center line to the wall of the hole, whereas taps remove material only from the wall of the hole. Since the direction of chip flow differs between the two tools, the required shape of the flute differs.

Japanese Patent Absract 06179121A (Dec. 14, 1992) to Haruo describes a spiral flute tap with a negative axial rake angle. Japanese Patent Abstract 04075816A (Mar. 10, 1992)

to Haruo describes a spiral fluted tap that has the corner of the thread flanks and entry lead surfaces chamfered. Japanese Patent Abstract 01171725A (Jul. 6, 1989) to Haruo describes a spiral fluted tap with a chip curler groove.

In reference to the cutting taps disclosed in the above patent documents, none of these documents addresses the chipping problems that occur when highly wear resistant, but lower strength substrates (e.g., tungsten carbide or cemented carbides like cobalt-cemented tungsten carbide) are used for spiral fluted cutting taps in the cutting of threaded holes. This is especially the case for cutting taps used to cut threaded holes (through holes and blind holes) of a smaller diameter. Thus, it would be highly desirable to provide a spiral fluted cutting tap made from highly wear resistant, but lower strength substrates (e.g., tungsten carbide or cemented carbides like cobalt-cemented tungsten carbide) that can be used to cut threaded holes, and especially threaded holes that are of a smaller diameter (e.g., generally less than 12 millimeters).

Further, it would be highly desirable to provide a spiral fluted cutting tap that provides for improved accuracy in cutting the threaded hole, and especially in the cutting of blind threaded holes. This would be the case for spiral fluted cutting tap s made from cemented carbides or high-speed steels.

It would also be highly desirable to provide a spiral fluted cutting tap that provides for improved useful tool life in cutting the threaded hole, and especially in the cutting of blind threaded holes. This would be the case for spiral fluted cutting taps made from cemented carbides or high-speed steels.

It would also be highly desirable to provide a spiral fluted cutting tap that provides for improved speed in cutting the threaded hole, and especially in the cutting of blind threaded holes. This would be the case for spiral fluted cutting tap s made from cemented carbides or high-speed steels.

SUMMARY OF THE INVENTION

In one form thereof, the invention is a cutting tool that includes an elongate body that has a forward end and a rearward end. The elongate body has a fluted portion that beginning near and extends in a rearward direction from the forward end. The spiral fluted portion has a flute that defines a cutting edge. The flute presents a concave cutting face wherein the concave cutting face is defined by a first radius. The flute further presents a concave core surface adjacent to the concave cutting face wherein the concave core surface is defined by a second radius. The flute presents a convex heel surface adjacent to the concave core surface wherein the convex heel surface is defined by a fourth radius.

In another form thereof, the invention is a cutting tool that comprises an elongate body that has a forward end and a rearward end. The elongate body has a fluted portion beginning near and extending in a rearward direction from the forward end. The fluted portion has a flute that defines a cutting edge. The flute presents a concave cutting face wherein the concave cutting face is defined by a first radius. The flute further presents a concave core surface adjacent to the concave cutting face wherein the concave core surface is defined by a second radius. The flute presents a convex blending surface adjacent to the concave core surface wherein the convex blending surface is defined by a third radius. The flute presents a convex heel surface adjacent to the concave core surface wherein the convex heel surface is defined by a fourth radius.

BRIEF DESCRIPTION OF THE DRAWINGS

The following is a brief description of the drawings that form a part of this patent application.

DETAILED DESCRIPTION

Figure 1:
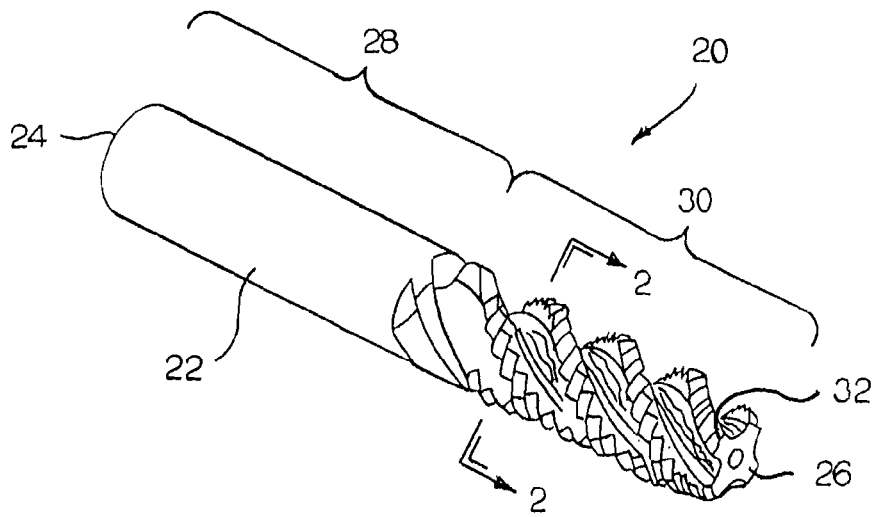
FIG. 1 is an isometric view of a specific embodiment of the spiral (helical) flute tap of the invention.

Referring to the drawings, FIG. 1 is an isometric view that illustrates a specific embodiment of the spiral fluted cutting tap (generally designated as 20) of the invention. Spiral fluted cutting tap 20 has an elongate body 22 with an opposite rearward end 24 and forward end 26. The spiral fluted cutting tap 20 has a generally smooth cylindrical shank portion shown by bracket 28 adjacent to the rearward end 24. A spiral fluted portion shown by bracket 30 begins at and extends rearwardly of the forward end 24 of the spiral fluted cutting tap 20. The spiral fluted cutting tap 20 has a cutting chamfer 32 at the axial forward end 26 thereof. As described hereinafter, the spiral fluted portion defines a cutting edge. During use, the spiral fluted cutting tap 20 is held by a machine tool by inserting the cylindrical shank portion 28 in a tool holder. It should be appreciated that the geometry of the shank portion could present a cross-section that is a square-shape.

Figure 2:
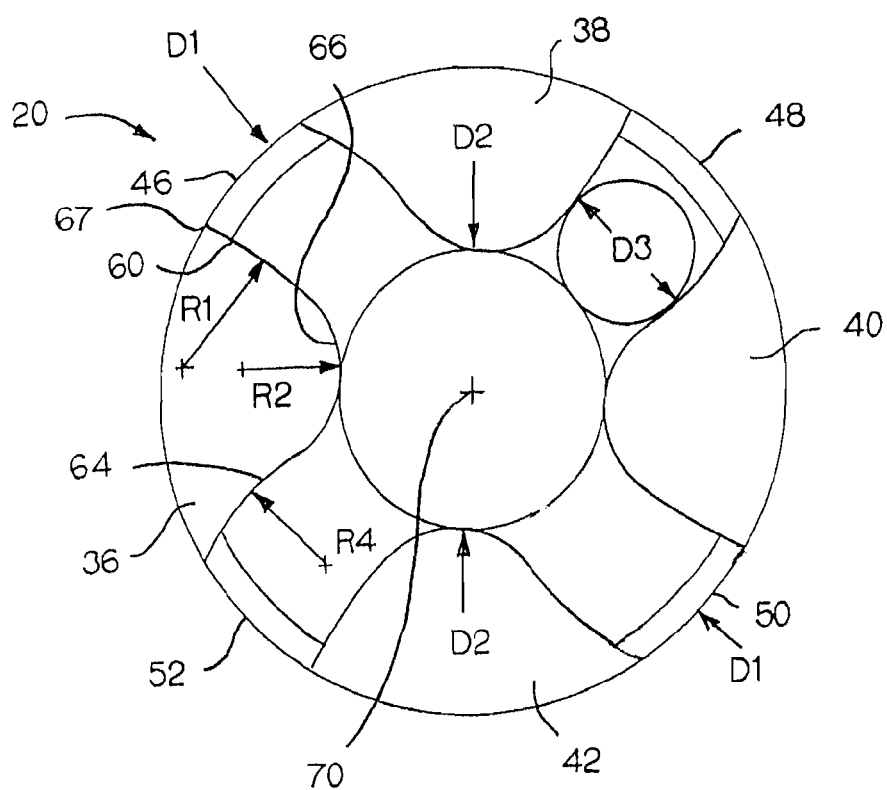
FIG. 2 is a cross-sectional view of the spiral (helical) flute tap of FIG. 1 taken along section line 2-2 in FIG. 1.

Referring to FIG. 2, spiral fluted cutting tap 20 has four helical flutes (or fluted portions) 36, 38, 40 and 42. It would be appreciated that applicants do not intend to limit the overall scope of the invention to a specific number of flutes. Each flute essentially separates a land surface 46, 48, 50, and 52. More specifically, helical flute 36 separates lands 46 and 52. Helical flute 38 separates lands 46 and 48. Helical flute 40 separates lands 48 and 50. Helical flute 42 separates lands 50 and 52. Each one of the lands (46, 48, 50, and 52) presents V-shaped thread flank surfaces that function to cut threads that define the threaded hole.

Each one of the helical flutes 36, 38, 40 and 42 presents essentially the same geometry. Thus, a description of helical flute 36 will suffice for a description of the other helical flutes (38, 40, 42) as well. However, it should be appreciated that for the sake of clarity, a feature common to all of the flutes may be discussed in reference to a flute other than flute 36.

The surface that defines the helical flute 36 can be characterized as having three basic portions. These portions are a concave cutting face 60, a concave core surface 66 and a convex heel surface 64.

In reference to the concave cutting face 60, the concave cutting face 60 is defined by a large concave radius (first radius R1). While the magnitude of the first radius R1 can vary depending upon the specific application, there seems to be a performance advantage if the first radius R1 is sufficiently large so the cutting face 60 is nearly a straight (or flat) surface. In this regard, a cutting face 60 that has a nearly straight (or flat) surface is created if the first radius R1 that forms the cutting face 60 is larger than the cutting tap diameter (or cutting tool diameter) D1. Applicants have found that a nearly flat cutting face 60 results in a chordal hook angle that remains constant along the cutting chamfer, and this aspect enhances the performance of the spiral fluted cutting tap.

In reference to the concave core surface 66, the concave core surface 66 is defined by a second radius (R2). The concave core surface 66 is contiguous with concave cutting face 60. In this specific embodiment, the concave core surface 66 provides a transition from the concave cutting face 60 to the convex heel surface 64.

In reference to the third portion is the convex heel surface 64, the convex heel surface 64 is defined by a fourth radius (R4). The concave core surface 66 is contiguous with the convex heel surface 64. Applicants have found that the chipping on the convex heel surface 64 can be avoided (or at least minimized) by forming the heel portion 64 with a convex radius R4. In the specific embodiment shown in FIG. 2, it can be appreciated that the surface of the flute 36 is defined by the combination of the concave cutting face 60, the concave core surface 66 and the convex heel surface 64.

Figure 2A:
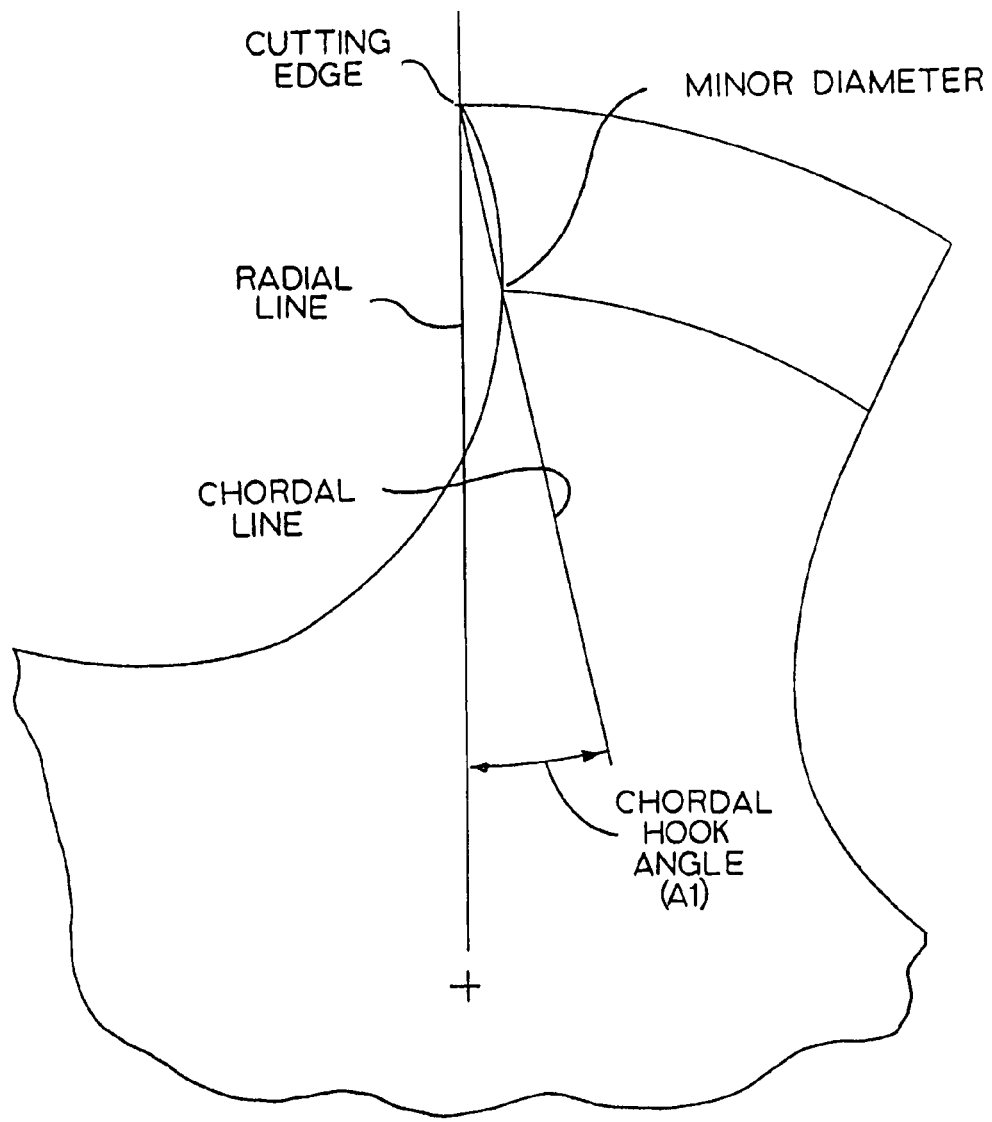
FIG. 2A is a mechanical schematic end view of a portion of a spiral fluted tap that illustrates the definition of the chordal hook angle.

Referring to FIG. 2A, as is known in the pertinent art (see *Machinery's Handbook*, 24$^{th}$ Edition, Oberg et al. Industrial Press, Inc. (1992) page 1696), a chordal hook angle is the angle between a radial line that passes through the distal cutting edge and a chordal line that extends between the distal cutting edge (crest) and the minor diameter (or root). The chordal hook angle is positive when the chordal line is positioned in a counterclockwise direction (as viewed in the drawing FIG. 2A) relative to the radial line. The chordal hook angle is negative when the chordal line is positioned in a clockwise direction (as viewed in the drawing FIG. 2A) relative to the radial line. The chordal hook angle is equal to zero when the chordal line lies on the radial line.

Applicants have found that in combination with a nearly straight cutting face 60, chipping of the cemented carbide taps is even further reduced by the use of a neutral chordal hook angle (A1, see FIG. 2A). In other words, when the cutting face 60 is on a line between the cutting edge 67 and the axial center 70 of the cutting tap, the cutting tap cuts effectively and the cutting edges (including cutting edge 67) have enough strength to resist chipping.

Applicants have found that the following different chordal hook angles may be suitable for different tapping applications when using cemented carbide taps. In this regard, a neutral chordal hook angle A1 is equal to about zero degrees, and such a chordal hook angle is optimum for tapping (i.e., cutting a threaded hole) many materials, and especially for tapping unhardened steel. For these materials, the range for a neutral chordal hook angle can be between four degrees negative and four degrees positive. However, it should be appreciated that the optimum chordal hook angle (A1) can be varied for other materials depending on the hardness and ductility of the material being tapped. For example, a chordal hook angle between five and ten degrees negative is suitable for tapping hard materials (e.g., hardened steels or brittle materials like cast iron). A chordal hook angle between five and fifteen degrees positive is suitable for tapping soft materials (e.g., aluminum). The applicants contemplate the same inventive flute shape can be used with taps manufactured from high speed steel substrates, but using higher chordal hook angles than listed above due to the higher strength of high speed steel as compared to cemented carbide.

Depending on size (i.e., diameter of the cutting tap), a spiral fluted tap of the present invention can have any number of flutes. For small diameter (i.e., less than about eight millimeters in diameter) spiral fluted cutting taps, three flutes are practical. Four flutes are practical for spiral fluted cutting taps in the middle size range (i.e., between about ten millimeters and about sixteen millimeters in diameter). Five flutes are suitable for larger size (i.e., greater than or equal to about eighteen millimeters in diameter) spiral fluted cutting taps. It should be appreciated that the range of cutting tap sizes may overlap with regards to the number of flutes since this aspect of the cutting tap can vary depending upon the specific tapping application.

In combination with the number of flutes, the flute helix angle may be varied over a fairly broad range according to the specific tapping application. For example, when a spiral fluted cutting tap of the invention is used to tap deep holes (e.g., a hole that has a depth greater than the diameter of the cutting tap), a fifty-five degree flute helix angle can be effective so that chips do not bind or jam in the flutes. As another example, when a spiral fluted cutting tap of the invention is used to tap shallower holes (e.g., a hole that has a depth equal to or less than the diameter of the cutting tap) in harder materials (e.g., hardened steel or cast iron), a fifteen degree flute helix angle can be used effectively whereby chips do not bind or jam in the flutes. As still another example, when a spiral fluted cutting tap of the invention is used to tap a threaded hole in a steel material or substrate, an optimum helix angle is equal to between about forty degrees and about fifty degrees.

As can be appreciated, it is very desirable to optimize the evacuation of the chips. This is the result of a consideration of the path the chips take after leaving the cutting edges and passing through or along the surfaces that define the flutes. In this regard, applicant have found that by minimizing the bending imposed on the chips as they curl within the flutes, the forces imposed on the cutting tap are reduced. It can be appreciated that a reduction in the forces imposed upon the cutting tap is an advantageous aspect. More specifically, given the constraints for the core diameter D2 and the inscribed circle that defines the land D3 (see FIG. 2), applicants have found that the optimum chip flow is achieved with R1 equal to or greater than the tap diameter D1, and R2 equal to between about five percent and twenty-five percent of D1, and R4 equal to between twenty percent and thirty percent of D1 (FIG. 2).

Applicant have also found another way by which one can minimize the bending imposed on the chips as they curl within the flutes. The specific embodiment shown in FIG. 3 illustrates this aspect of the invention.

Figure 3:
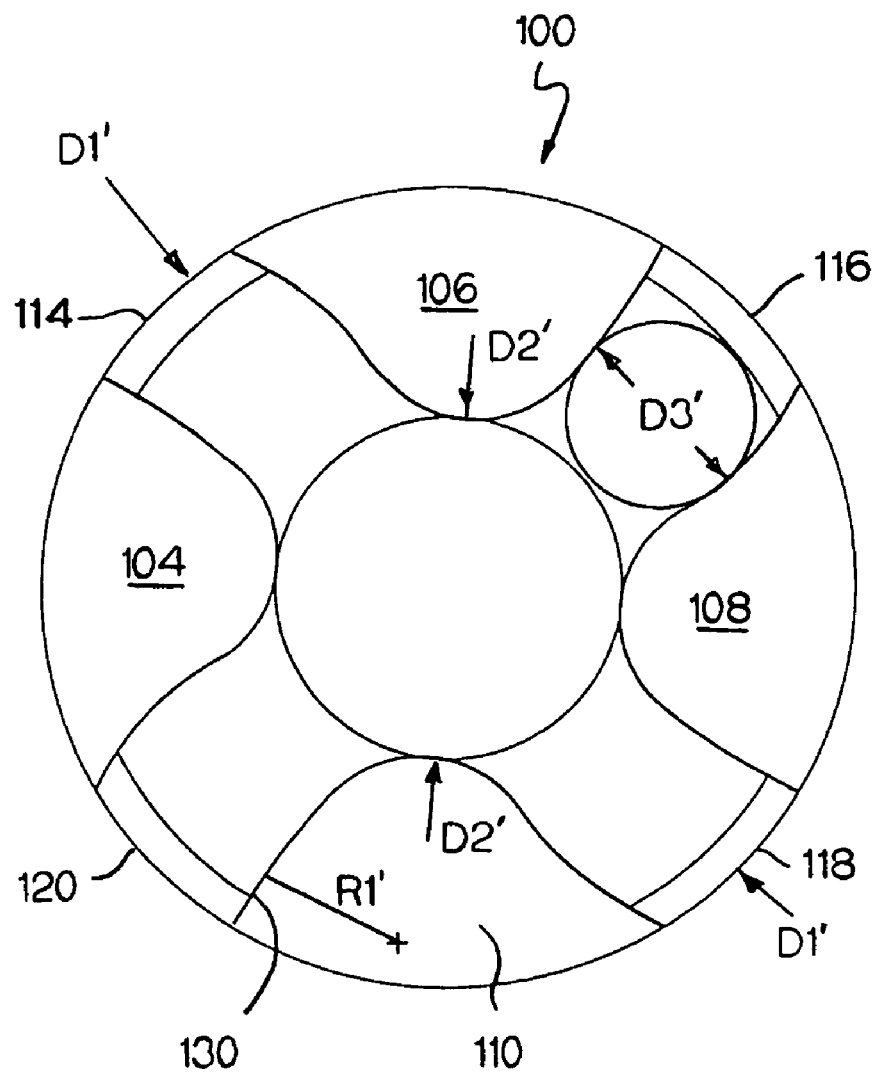
FIG. 3 is a cross-sectional view of a second specific embodiment of a spiral fluted cutting tap.

FIG. 3 is a cross-sectional view of the fluted section of a second specific embodiment of a spiral fluted cutting tap generally designated as 100. Although the entire spiral fluted cutting tap 100 is not illustrated, it should be understood that spiral fluted cutting tap 100 has an elongate body with an opposite rearward end and forward end. In one version, the spiral fluted cutting tap 100 can have a generally smooth cylindrical portion adjacent to the rearward end. However, it should be appreciated that in the alternative, the cutting tap 100 can have a square-shaped shank adjacent to the rearward end. The spiral fluted cutting tap 100 has a fluted portion that begins at and extends rearwardly of the forward end of the spiral fluted cutting tap. The spiral fluted cutting tap 100 connects via the cylindrical (or square-shaped) portion at the rearward end thereof to a tool holder or the like. As can be appreciated, the basic geometry of the spiral fluted cutting tap 100 is generally the same as spiral fluted cutting tap 20.

Figure 3A:
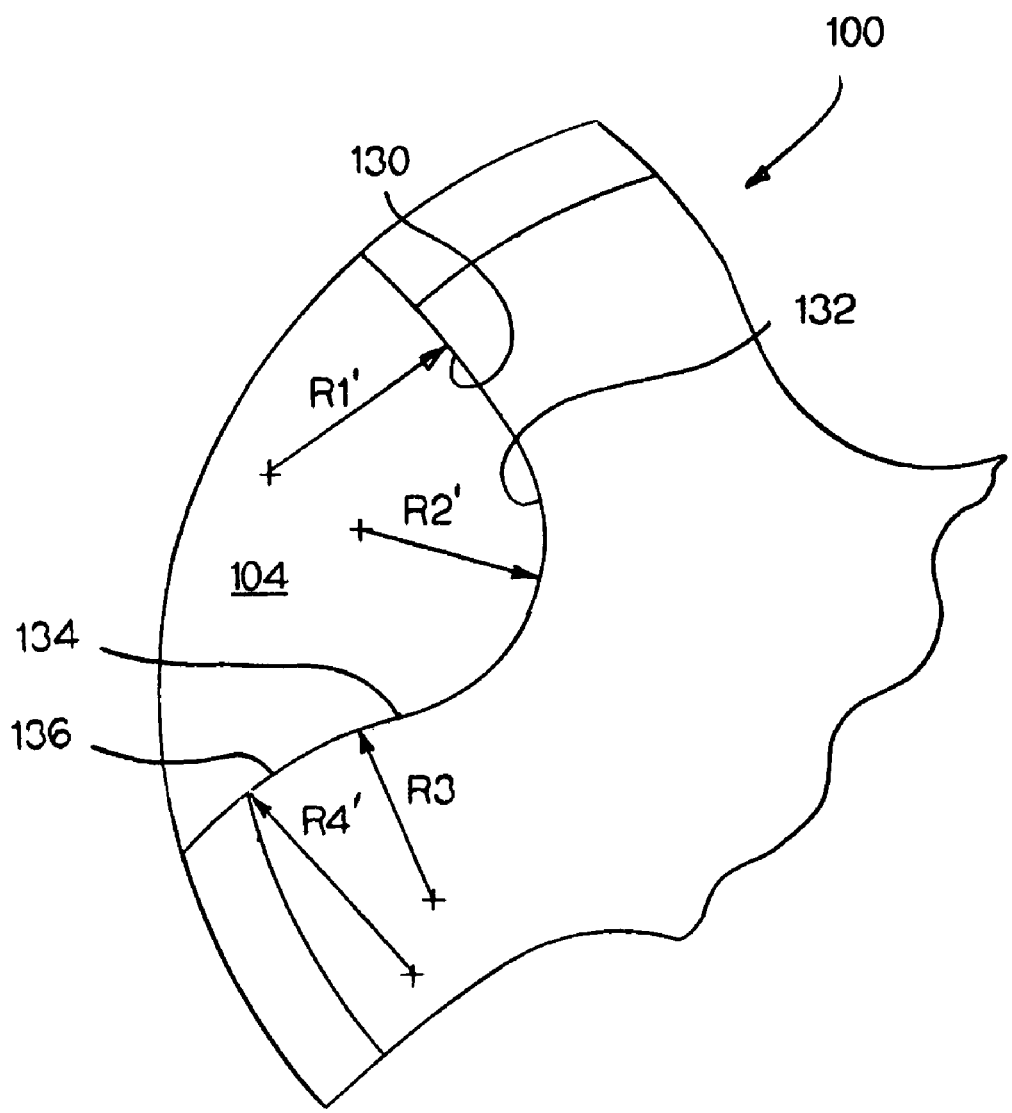
FIG. 3A is an enlarged view of a portion of FIG. 3 illustrating the flute 104 that separates lands 114 and 120 of the second specific embodiment of a spiral fluted cutting tap.

As illustrated in FIGS. 3 and 3A, spiral fluted cutting tap 100 has four helical flutes 104, 106, 108, 110. It would be appreciated that applicants do not intend to limit the overall scope of the invention to a specific number of flutes. Each flute essentially separates a land 114, 116, 118, and 120. More specifically, helical flute 104 separates lands 114 and 120. Helical flute 106 separates lands 114 and 116. Helical flute 108 separates lands 116 and 118. Helical flute 110 separates lands 118 and 120. Each one of the helical flank surfaces (114, 116, 118, 120) presents V-shaped thread flank surfaces that function to cut threads in the threaded hole.

Each on the helical flutes 104, 106, 108, 110 presents essentially the same geometry. Thus, a description of helical flute 110 will suffice for a description of the other helical flutes as well.

Referring to FIG. 3A, the surface that defines the helical flute 104 can be characterized as having four basic portions. These portions are a concave cutting face 130, a concave core surface 132, a convex blending surface 134 and a convex heel 136.

The cutting face 130 is defined by a first concave radius R1'. While the magnitude of the first radius R1' can vary depending upon the specific application, as mentioned earlier in connection with the specific embodiment of FIG. 2, there seems to be an advantage if the cutting face 130 is nearly a straight cutting face. In this regard, a nearly straight cutting face 130 is created if the first radius R1' that forms the cutting face is larger than the tap diameter D1'.

The concave core surface 132 is contiguous with the concave cutting face 130. Concave core surface 132 is defined by a second (concave radius) R2'.

A convex blending surface 134 is contiguous with the concave core surface 132. The convex blending surface 134 is defined by a third radius (R3).

A convex heel 136 is contiguous with the convex blending surface 134. Convex heel 136 is defined by a fourth radius (R4').

Applicants have found that the presence of the convex blending surface 134 enhances the performance of the cutting tap. In this regard, applicants have found that when the third radius (R3) of the convex blending surface 134 is equal to between about fifty percent and two hundred percent of the tap diameter (D1'), the convex surface created by third radius R3 reduces chip bending and enhances evacuation of the chips from the flute. As can be appreciated, a reduction in chip bending and an increase in chip evacuation enhances (or improves) the performance of the spiral fluted cutting tap.

In reference to the manufacture to the spiral fluted cutting tap, the cutting tap is manufactured from a cylindrical sintered tungsten carbide blank, which is sometimes referred to as a substrate. The more preferable material for the blank or substrate is cobalt-cemented tungsten carbide. The composition of the cobalt-cemented tungsten carbide can range between about six weight percent and about sixteen weight percent cobalt wherein the balance is tungsten carbide, as well as small amount of inevitable impurities. One alternate range of the cobalt can be between about six weight percent and about ten weight percent. Another range of the cobalt can be between about ten weight percent and about sixteen weight percent.

It should be appreciated that applicants contemplate that other carbides may be used such as tantalum carbide, titanium carbide and niobium carbide. In addition, applicants contemplate that a small amount of transition metal carbides may be contained in the blank to restrain grain growth. In the alternative, a high-speed steel may be used as the material for the blank. Typical high-speed steels are described in ASTM Standard A 600 REV A identified hereinabove.

Prior to grinding, the blank has a diameter that is sized larger than the finished dimensions of the cutting tap. The blank is also cut to length.

The first step in processing the blank is to grind the blank to precision cylindrical tolerances by methods such as cylindrical traverse grinding on centers or by centerless infeed grinding methods. During this grinding step, a cylindrical shank is ground to size at the axially rearward end of the cutting tap and the major diameter of a threaded body portion is formed at the axially forward end of the tap. Additionally during this grinding step, or as a result of an additional process step, an optional neck portion may be created with a cylindrical surface and a bevel between the cylindrical shank and the neck portion. Additionally, an optional bevel may be ground on the ends of the taps by cylindrical grinding.

In general, the shank diameter is approximately equal to the nominal thread diameter, but the shank diameter may be smaller than the nominal thread diameter for large diameter taps. The shank diameter may be larger for small diameter taps. Another option may be the grinding of a square as part of the shank at the extreme axially rearward end of the cutting tap (not shown).

In the next step, one or more flutes are ground on a helix so as to provide cutting edges, in combination with the chamfer, and a means for evacuating chips that form when the tap is used. As previously described, the helix angle depends on the application. The shape of the grinding wheel is formed so as to provide the selected radii of the cutting tap (e.g., first radius R1, R2, R4 and optional R3 when the flutes are ground on the helix).

In the next step, the threaded body portion is ground to form V-shaped thread flank surfaces, along with minor and major diameters, on a helix. Subsequently, the shape of a threaded cutting chamfer portion is formed by grinding. The V-shaped thread flank surfaces and major diameter replicate the internal screw thread that is generated during tapping. The threaded cutting chamfer portion is tapered so as to allow entry in the hole to be tapped.

After grinding, the tap may be honed with abrasive media or abrasive brushes so as to form a small radius on the cutting edges and other sharp corners. The resulting radius may be between 1 and 100 microns. This honing further increases the strength of these edges.

As a final step in the process, the tap may be optionally coated with a wear resistant coating scheme (not shown) of metal nitrides, carbides, carbonitrides, borides and/or oxides, wherein the metal is chosen from one or more of the following: aluminum, silicon and the transition metals from Groups IVa, Va, and VIa of the Periodic Chart. Specific examples of coating layers include (without limitation) titanium nitride, titanium carbonitride, titanium aluminum nitride and titanium silicon nitride. The coating scheme may be deposited as a single monolayer or in multiple (including alternating) layers via chemical vapor deposition (CVD) and/or physical vapor deposition (PVD) techniques.

In a test, a M12×1.75 mm pitch inventive cobalt-cemented tungsten carbide spiral fluted cutting tap was tested by tapping blind holes in AISI 4340 steel at 200 feet/minute on a CNC machining center. The cutting tap tapped 2000 holes of acceptable gauging quality with little wear. Conventional PVD coated spiral fluted HSS (high speed steel) taps of the current design are only capable of tapping 50 to 100 feet/minute. Thus, it appears that the spiral fluted cutting tap of the invention exhibited improved effectiveness as compared to the prior art cutting tap.

It is apparent that the present spiral fluted cutting tap of the invention provides a spiral fluted cutting tap that can be made from a highly wear resistant, but a lower strength substrate (e.g., tungsten carbide or cemented carbides like cobalt-cemented tungsten carbide). It is also apparent that the present spiral fluted cutting tap of the invention provides a spiral fluted cutting tap that exhibits improved accuracy in cutting the threaded hole, and especially in the cutting of blind threaded holes. It is further apparent that the present spiral fluted cutting tap provides for improved useful tool life in cutting threaded holes. Finally, it is apparent that the present spiral fluted cutting tap of the invention exhibits improved speed in cutting the threaded hole.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A spiral fluted cutting tap for cutting threads into a wall of a bore, the tap comprising:
   an elongate body having a forward end and a rearward end;
   the elongate body having a fluted portion beginning near and extending in a rearward direction from the forward end, and the fluted portion having a spiral flute defining a cutting edge adapted to cut threads;
   the spiral flute presenting a concave cutting face, and the concave cutting face being defined by a first radius;
   the spiral flute further presenting a concave core surface adjacent to the concave cutting face, and concave core surface being defined by a second radius;
   the spiral flute further presenting a convex blending surface adjacent the concave core surface, and the convex blending surface being defined by a third radius; and
   the spiral flute presenting a convex heel surface adjacent to the convex blending surface, and the convex heel surface being defined by a fourth radius.

2. The spiral fluted cutting tap according to claim 1 wherein the cutting tap has a cutting tap diameter, and the first radius defining the concave cutting face is equal to or greater than the cutting tap diameter.

3. The spiral fluted cutting tap according to claim 1 wherein the concave cutting face defining a chordal hook angle.

4. The spiral fluted cutting tap according to claim 3 wherein the chordal hook angle ranges between ten degrees negative and fifteen degrees positive.

5. The spiral fluted cutting tap according to claim 3 wherein the chordal hook angle being equal to about zero degrees.

6. The spiral fluted cutting tap according to claim 1 wherein the spiral flute has a helix angle between about ten degrees and about fifty-five degrees.

7. The spiral fluted cutting tap according to claim 6 wherein the helix angle ranges between about forty degrees and about fifty degrees.

8. The spiral fluted cutting tap according to claim 1 wherein the elongate body has four spiral flutes.

9. The spiral fluted cutting tap according to claim 1 wherein the cutting tap has a core diameter, the cutting tap has a cutting tap diameter, and the core diameter ranges between about thirty percent and about fifty percent of the cutting tap diameter.

10. The spiral fluted cutting tap according to claim 1 wherein the cutting tap has a cutting tap diameter, and the second radius ranges between about five percent and about twenty-five percent of the cutting tap diameter.

11. The spiral fluted cutting tap according to claim 1 wherein the cutting tap has a cutting tap diameter, and the fourth radius ranges between about twenty percent and about thirty percent of the cutting tap diameter.

12. The spiral fluted cutting tap according to claim 1 wherein the elongate body has a plurality of the spiral flutes, the cutting tap has a cutting tap diameter, and a land is between each adjacent one of the spiral flutes, and the land being defined by an inscribed circle having a third diameter, and the third diameter ranging between about fifteen percent and about twenty-five percent of the cutting tap diameter.

13. The spiral fluted cutting tap according to claim 1 wherein the elongate body having a cutting tap diameter, and the third radius ranging between about fifty percent and about two hundred percent of the cutting tap diameter.

14. The spiral fluted cutting tap according to claim 1 wherein the elongate body contains three of the spiral flutes.

15. The spiral fluted cutting tap according to claim 1 wherein the elongate body contains five of the spiral flutes.

16. The spiral fluted cutting tap according to claim 1 wherein the elongate body comprises cobalt-cemented tungsten carbide, and the cobalt content ranging between about ten weight percent and about sixteen weight percent.

17. The spiral fluted cutting tap according to claim 1 wherein the elongate body comprises high-speed steel.

18. The spiral fluted cutting tap according to claim 1 wherein the elongate body further includes a coating scheme, and wherein the coating scheme comprises one or more layers of one or more of the following: metal nitrides, carbides, carbonitrides, borides and/or oxides, wherein the metal is chosen from one or more of the following: aluminum, silicon and the transition metals from Groups IVa, Va, VIa of the Periodic Chart.

19. The spiral fluted cutting tap according to claim 1 wherein the cutting edge is honed with a radius between 1 and 100 micrometers.

20. The spiral fluted cutting tap according to claim 1 wherein the edges adjacent to the convex heel surface being honed with a radius between 1 and 300 micrometers.

21. A spiral fluted cutting tap for cutting threads into a wall of a bore, the tap comprising:
   an elongate body having a forward end and a rearward end;
   the elongate body having a fluted portion beginning near and extending in a rearward direction from the forward end, and the fluted portion having a spiral flute defining a cutting edge adapted to cut threads;
   the spiral flute presenting a concave cutting face, and the concave cutting face being defined by a first radius;
   the spiral flute further presenting a concave core surface adjacent to the concave cutting face, and concave core surface being defined by a second radius;
   the spiral flute further presenting a convex blending surface adjacent the concave core surface, and the convex blending surface being defined by a third radius;
   the spiral flute presenting a convex heel surface adjacent to the convex blending surface, and the convex heel surface being defined by a fourth radius; and
   the spiral fluted cutting tap having a core diameter, and the core diameter remaining substantially constant along the length of the fluted portion.

22. The spiral fluted cutting tap according to claim 21 wherein the elongate body having a cutting tap diameter, and the third radius ranging between about fifty percent and about two hundred percent of the cutting tap diameter.

* * * * *